United States Patent [19]

Zeevi et al.

[11] Patent Number: 4,956,794

[45] Date of Patent: Sep. 11, 1990

[54] SINGLE CAMERA THREE DIMENSIONAL HEAD POSITION SENSING SYSTEM

[75] Inventors: Yehoshua Zeevi; Oliver Hilsenrath, both of Haifa, Israel

[73] Assignee: Technion Research and Development Foundation Ltd., Haifa, Israel

[21] Appl. No.: 423,539

[22] Filed: Oct. 16, 1989

Related U.S. Application Data

[63] Continuation of Ser. No. 3,113, Jan. 14, 1987, abandoned.

[30] Foreign Application Priority Data

Jan. 15, 1986 [IL] Israel .......................... 77610

[51] Int. Cl.$^5$ .................. G06G 7/48; G09G 3/02; G01B 11/26
[52] U.S. Cl. .................. 364/559; 356/152; 358/104
[58] Field of Search ............ 364/550, 551.01, 559, 364/560, 561, 562, 563; 340/825.19, 705, 980; 356/141, 152; 358/103, 104

[56] References Cited

U.S. PATENT DOCUMENTS

| | | | |
|---|---|---|---|
| 3,862,358 | 1/1975 | Wolff | 358/104 |
| 4,028,725 | 6/1977 | Lewis | 340/980 X |
| 4,111,555 | 9/1978 | Ellis | 356/141 |
| 4,193,689 | 3/1980 | Reymond et al. | 356/141 X |
| 4,209,254 | 6/1980 | Reymond et al. | 356/141 X |
| 4,446,480 | 5/1984 | Breglia et al. | 364/559 X |
| 4,475,814 | 10/1984 | Marche | 356/152 X |
| 4,649,504 | 3/1987 | Krouglicof et al. | 364/559 |
| 4,682,159 | 7/1987 | Davison | 340/825.19 X |
| 4,684,247 | 8/1987 | Hammill, III | 356/141 X |
| 4,684,249 | 8/1987 | Ellis | 356/1 X |
| 4,836,778 | 6/1989 | Baumrind et al. | 356/152 |

OTHER PUBLICATIONS

Shepherd, J. T., "Helmet Mounted Sights and Display Systems", Conference: AGARD Lecture Series No. 76 on Electro-Optical Systems, London, England, (May 19-20, 1975), pp. 4-1 to 4-13.

Primary Examiner—Parshotam S. Lall
Assistant Examiner—Joseph L. Dixon
Attorney, Agent, or Firm—Helfgott & Karas

[57] ABSTRACT

A head position detector system includes a cue definition apparatus arranged to be securely mounted on a head whose position is to be monitored, a single camera electro-optical detector arranged to view the cue definition apparatus, a cue processing apparatus receiving an output of the detector and a memory apparatus for storing updated cue addresses for providing an output indication of head position to utilization apparatus.

28 Claims, 14 Drawing Sheets

SINGLE CAMERA THREE DIMENSIONAL HEAD POSITION SENSING SYSTEM

This is a continuation, of application Ser. No. 003,113, filed Jan. 14, 1987 now abandoned.

FIELD OF THE INVENTION

The present invention relates to three-dimensional object orientation detection systems and especially to high accuracy systems providing an output indication of head position.

BACKGROUND OF THE INVENTION

There presently exist many system applications wherein precise information regarding the head position of an operator is required for efficient operation. Examples of such applications are fire control systems for high performance aircraft employing helmet mounted displays wherein it is necessary to correlate target information with accurate head position information in order to properly display target information on the helmet display.

Other applications include positioning of weapons, visual field orientation for simulators, clinical head movement monitors, robotics and remote piloted vehicle orientation.

Head position indication devices presently exist in the form of binocular matching systems, electromagnetic phase-tracking systems and mechanical axis pickoffs. The first two types are quite expensive and complicated while the mechanical axis pickoffs interfere with free head movement of the operator.

Further examples of existing systems are as follows:

An electro-optical head position sensing system developed by CAE Electronics, Montreal, Canada which implements two detectors. Although detailed information is not available it appears that the system does not achieve the resolution and accuracy of the present system. (Ref: Fischetti. Truxal: "Simulating the Right Stuff"-IEEE Spectrum, March 1985).

A magnetic head position sensor has been developed by Polhemus for McDonald-Douglas. This system is sensitive to electromagnetic disturbances and changes in position of ferromagnetic objects. There are also problems in linearity and calibration. (Ref: "Operating and Maintenance Manual for the Vcass/Ahms System"-OMM-80-1018-1-8 Apr. 80, Polhemus Navigation Sciences Inc.).

An electro-optical system by Selspot AB, Sweden implements two detectors . This system is only useful for relatively large distances from the sensed object. It is sensitive to optical disturbances and therefor only useful indoors.

SUMMARY OF THE INVENTION

The present invention seeks to provide a high accuracy. cost-effective head position detector which overcomes the disadvantages of the prior systems.

There is thus provided in accordance with an embodiment of the present invention a head position detector system comprising a cue definition apparatus arranged to be securely mounted on a head whose position is to be monitored, electro-optical detector apparatus arranged to view the cue definition apparatus, cue processing apparatus receiving an output of the detector apparatus and memory apparatus for storing updated cue addresses for providing an output indication of head position to utilization apparatus.

Further in accordance with a preferred embodiment of the invention, the detector apparatus comprises a conventional video camera providing video and sync outputs.

Additionally in accordance with a preferred embodiment of the invention, the memory apparatus comprises a cue address processor receiving timing signals in response to the sync output of the video camera apparatus, a cue memory map and a memory multiplexer interfacing between the cue address processor and the cue memory map.

Further in accordance with an embodiment of the present invention, the system also comprises a control computer which governs the operation of the memory apparatus and accesses the cue memory map by time sharing.

Additionally in accordance with a preferred embodiment of the invention, the system also comprises a host computer which accesses the control computer.

Additionally in accordance with a preferred embodiment of the invention, the system is operative to provide an output indication of head rotation with resolution of up to 0.2 degrees, and head translation with resolution of up to 0.1 mm.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
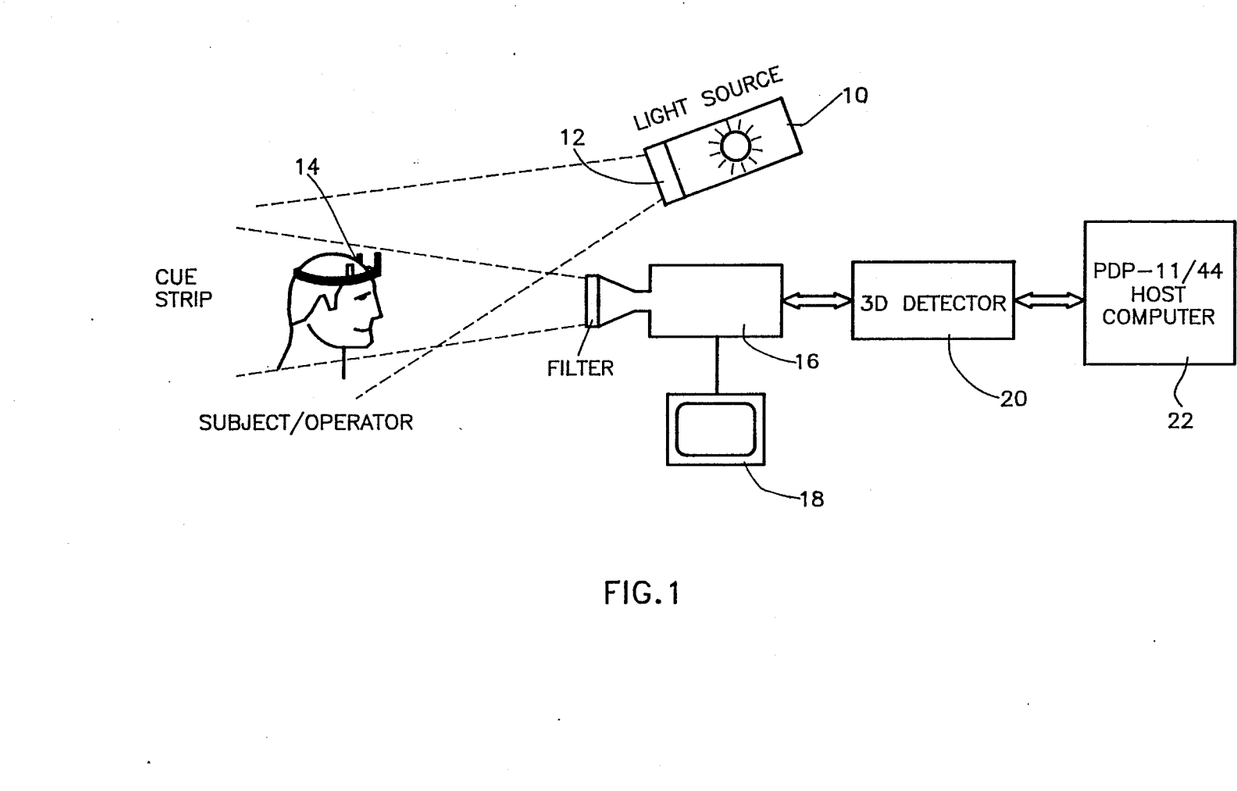
FIG. 1 is a partially pictorial, partially block diagram illustration of a specific head position detection system according to an embodiment of the present invention

Reference is now made to FIG. 1, which illustrates, in a general way, the head position detection system of the present invention. A light source 10, equipped with a suitable filter 12, illuminates the head of a subject whose position is to be monitored by the system of the present invention. The subject has fixedly mounted onto his head cue definition apparatus 14, which is illustrated in detail in FIG. 3 and described hereinafter in connection therewith. It is appreciated that this cue definition apparatus may or may not be mounted directly onto the head of the subject. Alternatively, it may be mounted onto a helmet or other head mounted device.

A conventional video camera 16, operating at conventional video scan rates, is arranged to view the cue definition apparatus and may be provided with a suitable filter to assist in removing unwanted background noise and spurious information. A monitor 18 may be associated with the video camera. The video camera outputs to three-dimensional position detection circuitry 20, which interfaces, via a conventional data communications link such as an RS 232, with a host computer 22, for example, a PDP 11/44.

Figure 2:
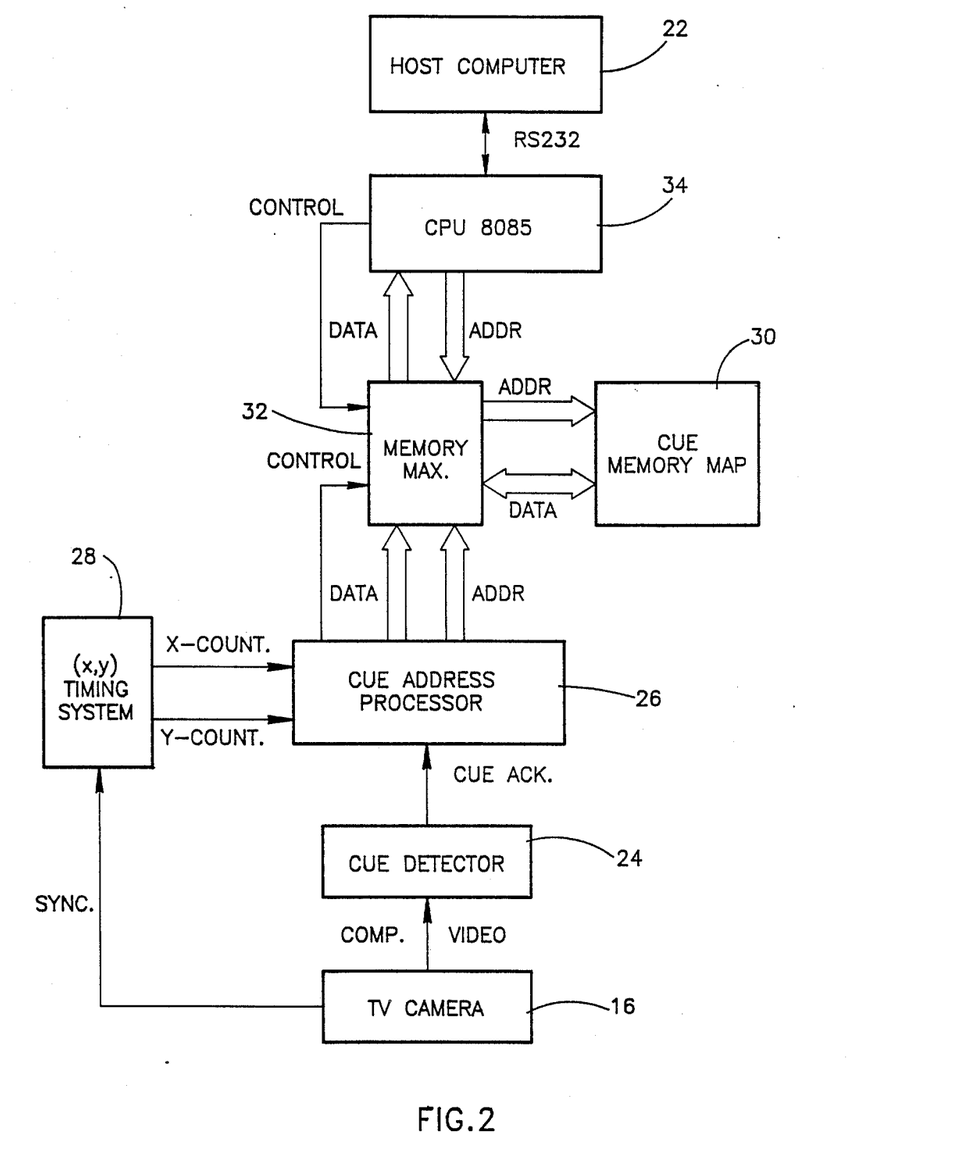
FIG. 2 is a block diagram illustration of the system architecture of the head position detection system of FIG. 1.

Turning now to FIG. 2, it is seen that the three dimensional position detection circuitry 20 of FIG. 1 comprises a cue detector 24, which receives the video output from the video camera 16. The cue detector is operative to recognize the cues appearing on the cue definition apparatus by analysis of the video stream and provides an output to a cue address processor 26.

Figure 5:
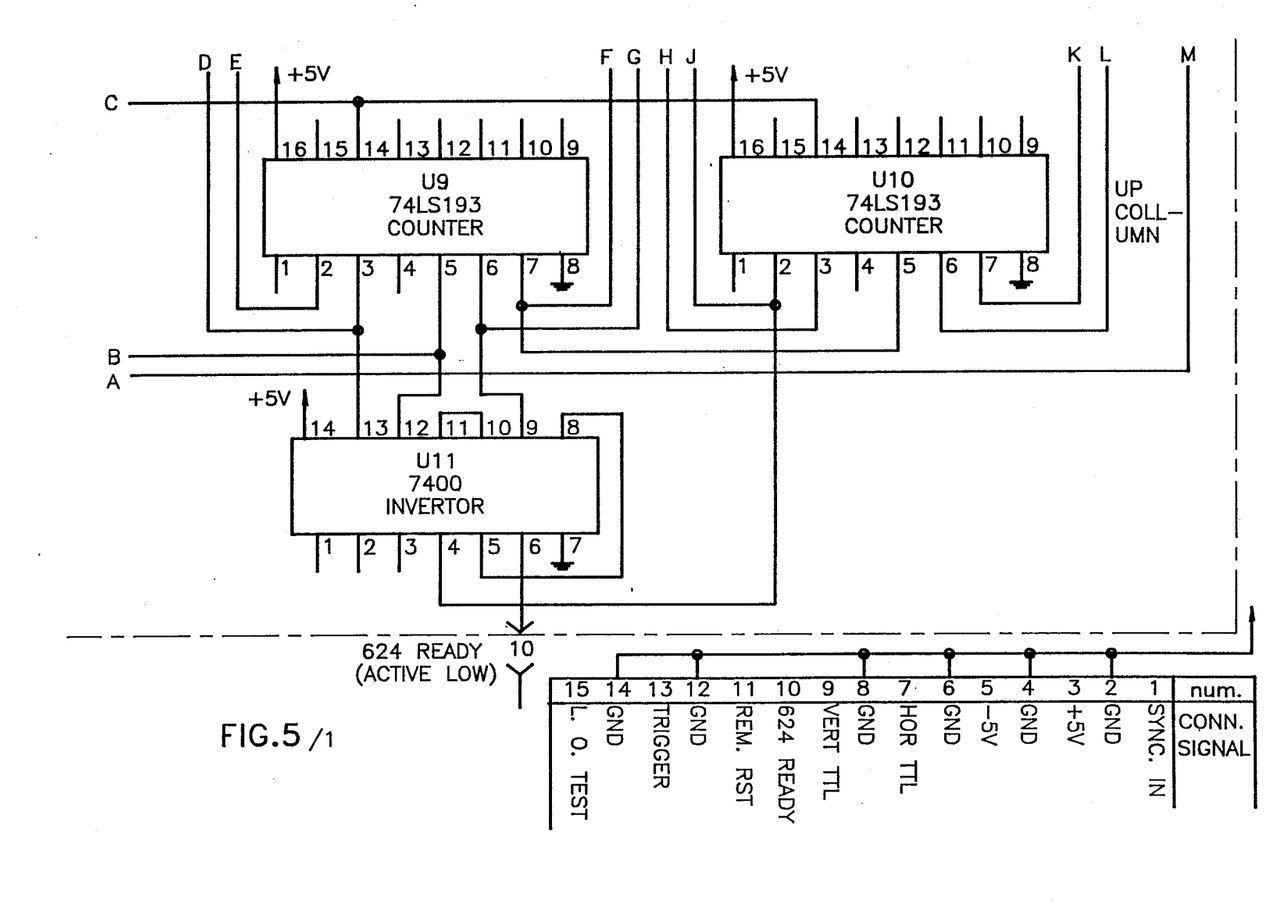
FIG. 5 is a schematic illustration of the timing circuitry employed in the system of FIG. 2.

The cue address processor 26 receives timing signals from timing circuitry 28, which is illustrated fully in schematic form in FIG. 5 and receives the sync output of the video camera 16. The cue address processor 26 interfaces with a cue memory map 30 via a memory multiplexer 32 which also interfaces with a special purpose control computer 34, including a microprocessor such as an Intel 8085. The control computer 34, in turn interfaces with host computer 22 (FIG. 1). In FIG. 5, U1 is a horizontal Sync. input amplifier, U2 is one-shot multivibrator, U3, U4 are NAND circuits, U5–U10 is a horizontal and vertical counter, and U11 is an inverter.

Figure 6:
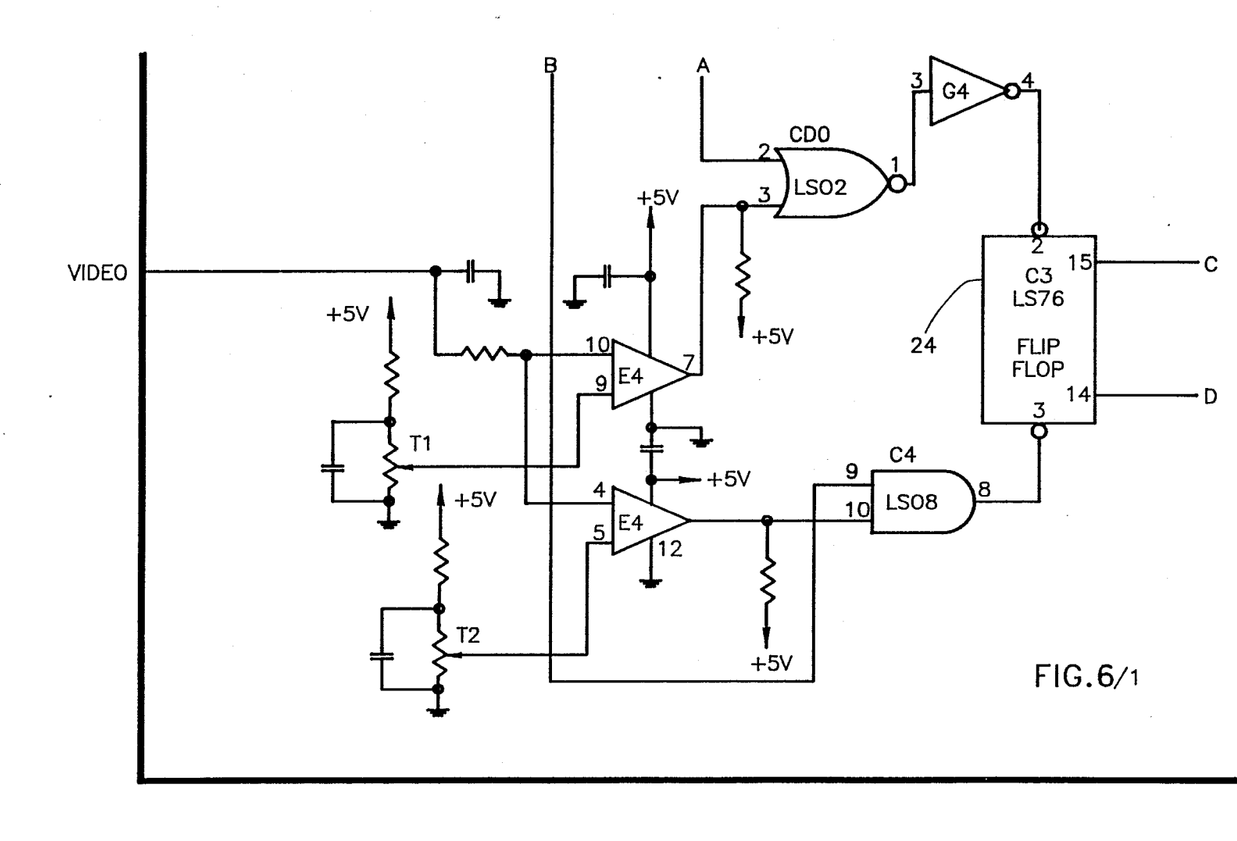
FIG. 6 is a schematic illustration of the cue memory map, memory multiplexer, cue address processor and cue detector circuitry of FIG. 2.

The detailed structure of the cue detector 24, cue address processor 26, cue memory map 30 and memory multiplexer 32 are fully set forth in schematic form in FIG. 6. In FIG. 6 cue detector 24 includes buffer amplifier E4, NOR circuit CD0, inverter G4, AND circuit C4 and flip-flop latch C3; address processor 26 includes I/O buffers E2, E3, address counter G1–G3, inverter H3. Cue memory map 30 is RAM. Memory multiplexer 32 includes I/O buffers Cl, D1, C2, B1, D2, A3, A4, 1, H2 and E2, E3 and address counters A1–A4.

A listing of the software embodied in the circuitry of FIG. 6 is submitted as ana appendix which is not printed as part of the Letters Patent but has been retained in the Patent File.

Briefly stated, the operation of the system is as follows: The video camera, which is typically scanned at standard TV rates, provides composite video and sync outputs. The cue detector recognizes the cue appearance by analyzing the video stream and enables insertion of the cue address into the cue memory map. The timing circuitry ensures that the current addresses of the cues are always available at the cue address processor. The CPU 8085 accesses the cue memory map in a timesharing mode in order to provide an output indication of the five degree of freedom position of the head in real time at video frame speed. The apparatus provides immunity to video saturation and to variations in the intensity over space and time.

Figure 3:
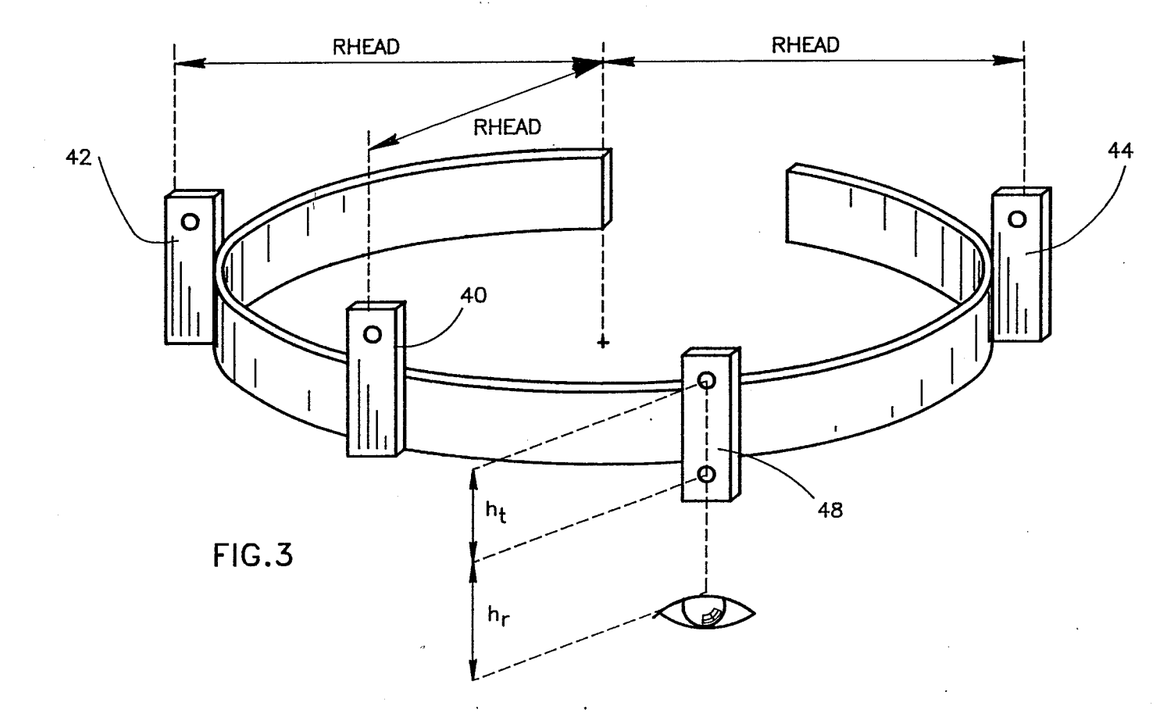
FIG. 3 is an illustration of cue definition apparatus employed in the system of FIG. 1.
Figure 4A:
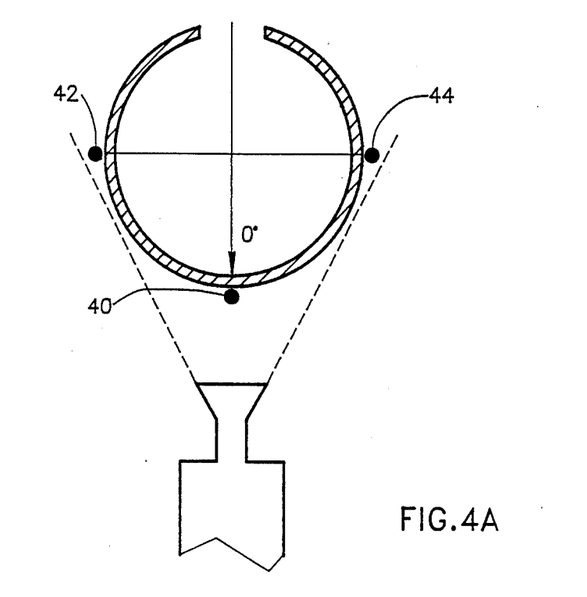
FIGS. 4A and 4B are azimathal illustrations of the cue definition apparatus of FIG. 3 and of modified apparatus respectively.

Reference is now made to FIGS. 3 and 4A which illustrate the cue definition apparatus 14 (FIG. 1). It is seen that the cue definition apparatus defines three cues 40. 42 and 44 located along an imaginary circle having its center located at the center of the subject head. Each cue is defined by a single dot.

The dots are distributed as follows: Cue 40 is at the front center of the head, cue 42 is at the left side of the head as viewed from the front and cue 44 is at the right side of the head as viewed from the front. The cues are separated from each other by 90 degrees in the plane of the imaginary circle.

In addition to cues 40, 42 and 44 there is provided an additional cue 48 comprising two vertically spaced dots whose vertical spacing is equal to the vertical spacing between the lowermost of the two dots and the subject's adjacent eye.

Figure 4B:
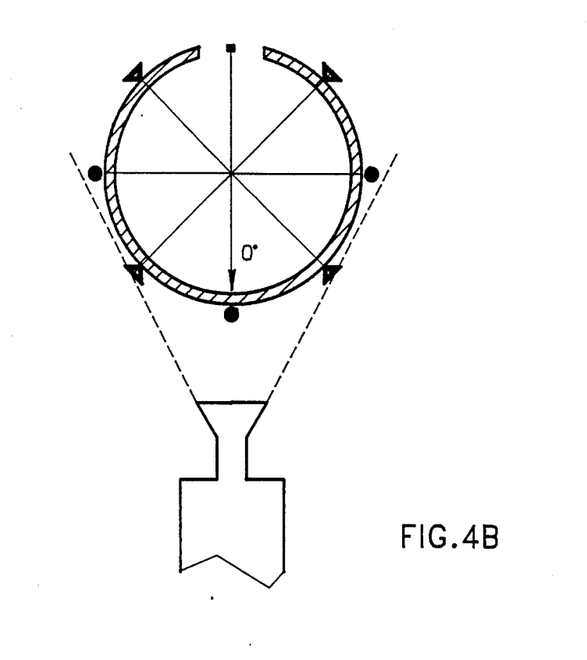

Reference is now made to FIG. 4B which illustrates an alternative embodiment of cue definition apparatus. Although the system is the same, the cues are temporally or spacially identified so that in every position ($-180$ degrees $- +180$ degrees) there exist enough cues for full three-dimensional identification of head position.

It will be appreciated by persons skilled in the art that the present invention is not limited by what has been particularly shown and described hereinabove. Rather the scope of the present invention is defined only by the claims which follow:

We claim:

1. A head position detector system comprising:
cue definition means carrying thereon a plurality of cues and arranged to be securely mounted on a head of a subject, a position of which is to be monitored, said cues being arranged on said cue definition means so as to provide a full three-dimensional identification of the head position;
a single camera arranged to view all of said cues of the cue definition means;
cue detection means receiving an output of said camera; and
memory means for storing updated cue addresses for providing an output indication of the head position to a utilization apparatus.

2. A system according to claim 1 and wherein said camera means comprises a conventional video camera providing video and sync outputs.

3. A system according to claim 2 and wherein the memory means comprises:
a cue address processor receiving timing signals in response to the sync output of the camera means;
a cue memory map; and
a memory multiplexer interfacing between the cue address processor and the cue memory map.

4. A system according to claim 2 and also comprising a control computer which governs the operation of the memory means.

5. A system according to claim 2 and also comprising a host computer which accesses the control computer.

6. A system according to claim 2, wherein said cue detection means and said memory y means are arranged to provide an output indication of head rotation with resolution of up to 0.2 degrees.

7. A system according to claim 2 and wherein said cue definition means comprises at least three cues arranged to be distributed over a subject's head.

8. A system according to claim 1 and wherein the memory means comprises:
a cue address processor receiving timing signals in response to the sync output of the camera means;
a cue memory map; and
a memory multiplexer interfacing between the cue address processor and the cue memory map.

9. A system according to claim 8 and also comprising a control computer which governs the operation of the memory means.

10. A system according to claim 8 and also comprising a host computer which accesses the control computer.

11. A system according to claim 8, wherein said cue detection means and said memory means are arranged to provide an output indication of head rotation with resolution of up to 0.2 degrees.

12. A system according to claim 8 and wherein said cue definition means comprises at least three cues arranged to be distributed over a subject's head.

13. A system according to claim 1 and also comprising a control computer which governs the operation of the memory means.

14. A system according to claim 13 and also comprising a host computer which accesses the control computer.

15. A system according to claim 13, wherein said cue detection means and said memory means are arranged to provide an output indication of head rotation with resolution of up to 0.2 degrees.

16. A system according to claim 13 and wherein said cue definition means comprises at least three cues arranged to be distributed over a subject's head.

17. A system according to claim 1 and also comprising a host computer which accesses the control computer.

18. A system according to claim 1, wherein said cue detection means and said memory means are arranged to provide an output indication of head rotation with resolution of up to 0.2 degrees.

19. A system according to claim 1 and wherein said cue definition means comprises at least three cues arranged to be distributed over a subject's head.

20. A system according to claim 19 and wherein said cue definition means also comprises at least one eye location cue including a pair of vertically spaced cue locations.

21. A system according to claim 1, wherein said cue definition means comprise three cues located along an imaginary circle having its center located at the center of the head.

22. A system according to claim 21, wherein said cue definition means also includes fourth and fifth cues vertically spaced from each other by a distance generally equal to the vertical spacing between a lowermost portion of the fourth and fifth cues and an eye of the subject.

23. A head position detector system comprising:
cue definition means carrying cues thereon and arranged to be securely mounted on a head of a subject, a position of which is to be monitored;
a single camera arranged to view said cues of the cue definition means;
cue detection means receiving an output of said camera; and
memory means for storing updated cue addresses for providing an output indication of the head position to a utilization apparatus,
said cue definition means comprising three cues located along imaginary circle and being angularly spaced from each other, said imaginary line having its center located at the center of the head to be monitored.

24. A system according to claim 23, wherein said cue definition means also includes a fourth and fifth cues angularly spaced from said three cues and vertically spaced from each other by a distance generally equal to a vertical spacing between the lowermost of the fourth and fifth cues and an eye of the subject.

25. A system according to claim 23, and further comprising a single light source arranged to illuminate all said cues simultaneously.

26. A system according to claim 23, wherein the memory means comprises:
a cue address processor receiving timing signals in response to the sync output of the camera means;
a cue memory map; and
a memory multiplexer interfacing between the cue address processor and the cue memory map.

27. A system according to claim 23, further comprising a control computer which governs the operation of the memory means.

28. A system according to claim 23, further comprising a host computer which accesses the control computer.

* * * * *